United States Patent [19]

Welch

[11] Patent Number: 4,645,061

[45] Date of Patent: Feb. 24, 1987

[54] MACHINE FOR STACKING NESTABLE EXTRUDED CANS

[76] Inventor: Hubert E. Welch, 1941 Bavil St., Ceres, Calif. 95307

[21] Appl. No.: 705,605

[22] Filed: Feb. 26, 1985

[51] Int. Cl.$^4$ .............................................. B65G 57/06
[52] U.S. Cl. ..................................................... 198/420
[58] Field of Search .............. 198/420, 422, 524, 532; 209/644; 221/295, 312

[56] References Cited

U.S. PATENT DOCUMENTS

| | | | |
|---|---|---|---|
| 3,288,269 | 11/1966 | Roth et al. | 198/422 X |
| 3,596,761 | 8/1971 | Campbell | 198/422 X |
| 3,850,282 | 11/1974 | Calvert et al. | 198/420 |
| 3,921,808 | 11/1975 | Sakai | 209/644 X |
| 4,307,800 | 12/1981 | Joa | 198/422 X |

Primary Examiner—Joseph E. Valenza
Assistant Examiner—D. Glenn Dayoan
Attorney, Agent, or Firm—Hamrick, Hoffman, Guillot & Kazubowski

[57] ABSTRACT

A can stacking infeed machine for stacking nestable extruded cans where can diameter is greater than can height, includes a pair of gravity chutes for dividing an elevated stream of cans at input into two streams of cans, one above the other at output. A rotating starwheel collocates the cans sliding down the chutes one above the other for discharge in vertically registering pairs. A leaf spring mechanism urges the bottom of the upper can into nested engagement with the top of the lower can as the starwheel rotates releasing the cans to slide from the machine. Normally open switches located for sensing the flow of cans down both gravity chutes interrupt rotation of the starwheel thus preventing discharge of a single can from either chute. Stacked can pairs are accelerated upon release by the rotating starwheel as they slide from the machine to provide spacing.

9 Claims, 5 Drawing Figures

MACHINE FOR STACKING NESTABLE EXTRUDED CANS

BACKGROUND OF THE INVENTION

1. Field of the Invention:

The invention generally relates to a machine for stacking extruded containers having bottoms dimensioned for nested engagement within tops, and particularly relates to a machine for stacking nestable extruded containers where container diameter is greater than container height.

2. Description of the Prior Art:

Cans and containers in which food and other products are packaged are typically shipped in cartons or boxes (cases). Where the diameter or width of the container is greater than its height, the containers (cans) are stacked in two or more levels in a case. Various machines have been developed for stacking such cans and containers for placement in a case.

For example U.S. Pat. No. 2,645,328, F. WINTERS, describes an apparatus for automatically stacking flat cans moving in a single-layer stream on an elevated conveyor into one or more vertical stacks of a predetermined number of cans on a lower level conveyer. The cans alternately slide down a lower chute for stacking cans at a first position and an upper chute stacking cans at a second position. The lower conveyer incrementally advances moving cans stacked at the first position by the lower gravity chute to the second position where cans are stacked by the upper gravity chute on top of the cans previously stacked by the lower chute. Vertical stability of the stacked column of cans is aided by nesting of the bottom of one can into the depressed lid of the can below or above it in the column.

The disadvantages of the apparatus of the type taught by WINTERS, relates to the necessity of maintaining the vertical stability of the stacked columns of cans as they are move downstream on the conveyer system to the point of casing. In particular, during stacking, the preceding column of cans arrests forward travel of each can in order to achieve a vertical column, and after the vertical column is established that column must move adjacent with other columns in rows within chutes having side walls to prevent the column from toppling.

U.S. Pat. No. 3,850,282, CALVERT et al. describes another article stacking mechanism in which a starred wheel receives and translates a container moving in an upper stream sideways into vertical registry over a container moving in a parallel stream below the upper stream. Containers moving in the lower stream are received and held in position by a second starwheel rotating on a common shaft with the first starwheel. Side rails prevent the respective starwheels from toppling the containers as they are received from the conveyers.

In CALVERT it is necessary to both restrain and support the the upper can as it translates sideways to a position vertically above the can in the lower stream. Vertical stability of the stacked containers is aided by nested engagement of the bottom of the upper container within the top of the lower container.

SUMMARY OF THE INVENTION

The invented can stacking machine, includes a pair of gravity chutes receiving and dividing a stream of cans carried by an elevated conveyer at input into two streams of cans, one above the other at output. A split starwheel receives, collocates and discharges cans from the gravity chutes in vertically registering pairs. A leaf spring mechanism urges the bottom of the upper can into nested engagement within the top of the lower can as each pair of vertically registering cans slide from the gravity chutes to provide a single stream of stacked pairs of cans. The invented machine is particularly suited for stacking extruded cans having a diameter greater than their height.

A unique feature of the invented machine that the rate of discharge of stacked pairs of cans is controlled by the rate of rotation of the split starwheel.

Another feature of the invented machine is an accelerating slide located at the discharged end of the machine for accelerating the stacked pairs of cans as they are discharged to provide sufficient spacing between the stacked pairs so that toppling collisions on the lower conveyer do not occur.

Still another feature of the invented can stacking infeed machine relates to normaly open switches located for sensing the flow of cans down both gravity chutes for interrupting and preventing discharge of single cans from either gravity chute.

An advantage of the invented machine relates to the the fact that each sprocket of the starwheel functions as a stop.

Still other features, aspects, objects and advantages of the invented can stacking infeed machine may be ascertained with reference to the following drawings and description of a preferred embodiment thereof.

DESCRIPTION OF THE PREFERRED EMBODIMENT

Figure 1:
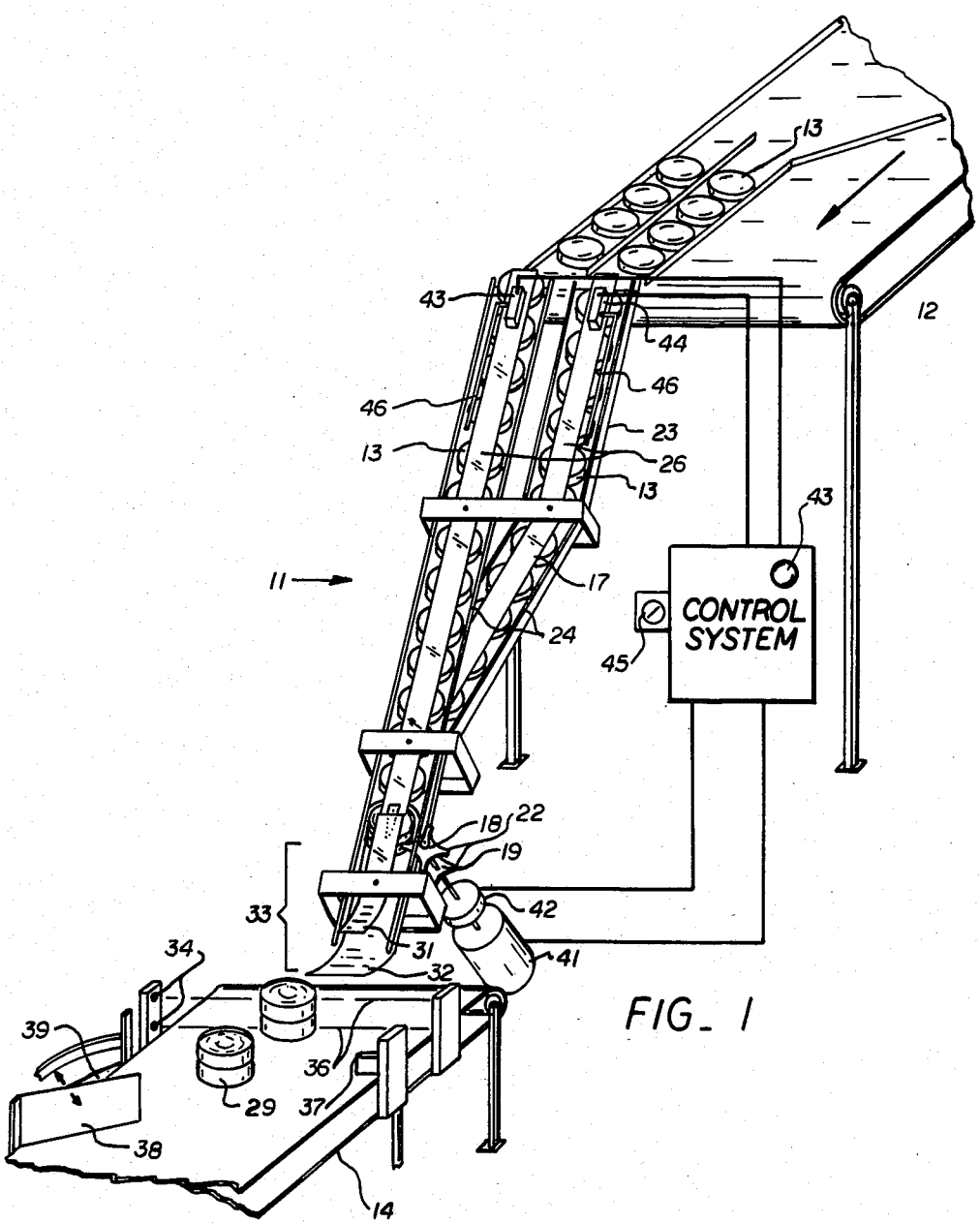
FIG. 1 is a perspective view of the invented infeed can stacking machine.

Referring to FIG. 1, the invented can stacking machine 11, is located between an elevated conveyer 12 carrying a single layer of cans 13 and a lower conveyor 14. The lower conveyer 14 may comprise an input to a conventional can casing apparatus such as Non-shock Casing Apparatus manufactured by Food Machinery Corporation of San Jose California.

The stream of cans delivered by the elevated conveyer 12, is received, divided and input side-by-side into an upper and lower gravity chute 16 and 17 respectively. The cans 13 slide down the respective chutes 16 and 17 for output in two parallel streams, one directly above the other.

Figure 3:
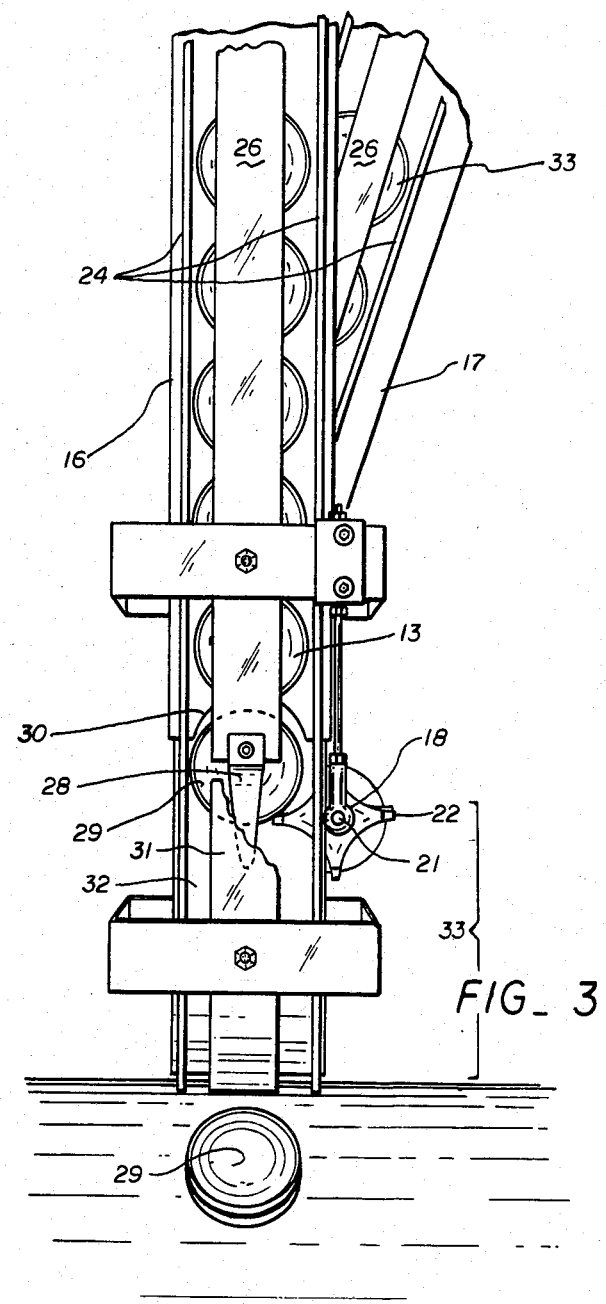
FIG. 3 is a top view illustrating the relationship between the collocating starwheel and the cans.

The flow of cans 13 out both the upper and lower chutes 16 and 17 is stopped by extending arms 22 of a pair of starwheels 18 and 19 rotating on a common shaft 21. The shaft 21 rotates the starwheels 18 and 19 about an axis oriented perpendicularly with respect to the chutes, 16 and 17 such that the extending arms 22 of the starwheels 18 and 19 interdicts the flow of cans 13 sliding down the respective chutes 16 and 17 just before discharge (see FIG. 3).

The two starwheels 18 and 19 are essentially collocating means for assuring vertical registry of the cans 13 in the upper and lower chutes. In particular, each arm 22 of the upper starwheel 18 rotates in a common plane with an arm 22 of the lower starwheel 19. Accordingly, cans 13 sliding down the chutes 16 and 17 stopped by the arms 22 are aligned vertically. A single "split" starwheel with parallel arm pairs extending from a common shoulder journaled around a shaft would be functionally equivalent to the two starwheels 18 and 19.

Figure 4:
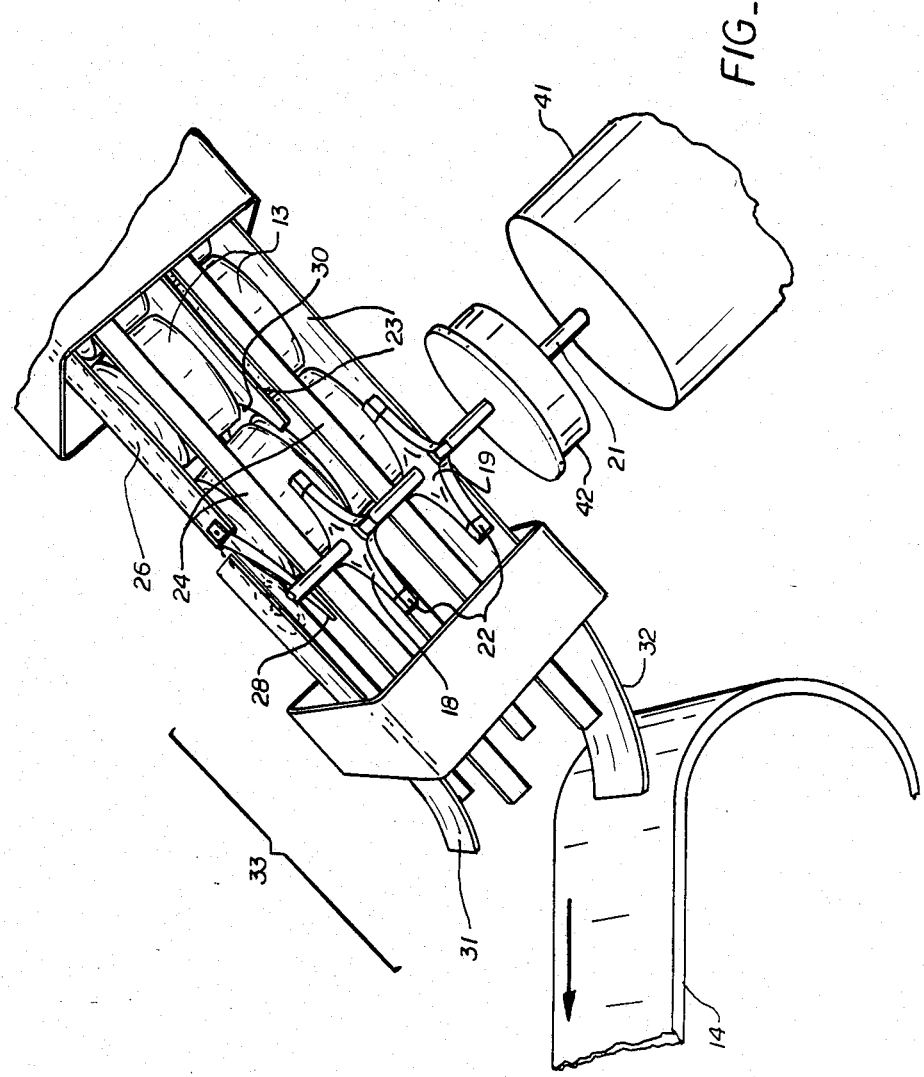
FIG. 4 is an enlarged side elevation view of the discharge end of the invented machine.

In more detail, referring to FIGS. 1 and 4, at input, gravity chutes 16 and 17 of the machine are each defined by a sliding platform 23, two side rails 24, and a top rail 26. At output, the upper chute 16 is defined by the sliding platform 23, side rails 24 and a top rail 26, and the bottom chute 17 is defined by the sliding platform 23 the side rails 24 and the sliding platform 23 of the top chute 16. In essence, the sliding platform 23 of the top chute becomes the top rail for the lower chute. The upper chute sliding platform 23 terminates with a concave or scalloped lip or edge 30. A leaf spring 28 is mounted on the end of the top rail 26 of the upper chute 16 and extends angularly downward. The vertical distance between the extending end 25 of the leaf spring 28 and the sliding platform of the lower chute 17 is less than the height of two cans 13 when vertically stacked.

The leaf spring 28 is positioned above the lip 30 of the upper chute sliding platform 23 for resiliently engaging the leading or downstream portion of each can 13 as it slides out of the upper chute 16 aross the lip 30. The spring 28 causes the cans 13 sliding from the top chute 16 to tip and slide off the lip 30, into the leading or downstream portion of the top of the cans 13 sliding down the lower chute 17 directly below. The shaft 21 rotating the collocating starwheels 18 and 19 is positioned approximately one can diameter downstream from the point where a can 13 sliding out of the upper chute 16 slides free of the lip 30 and is completely supported by the can 13 sliding down the lower chute directly below. As shown in FIG. 4, the upper can is initially tilted with respect to the lower can. Upon rotation of the starwheels 18 and 19, releasing the stacked cans 29 for discharge from the machine 11, the spring resilliently forces the upstream or following portion of the upper can downward into the lower can as the stacked can pair 29 slides past the end 25 of the spring 28.

The combination of the extending arms 22 of the top and bottom starwheels 18 and 19 the side rails 24 of the respective chutes, the leaf spring 28 and sliding platform 23 of the bottom chute 17, establish and then maintain vertical registry of the upper and lower cans 13 until the bottom of the top can is completely nested within the top of the bottom can. The nested engagement of the stacked pair of cans 29 is then maintained between a pivoting top rail 31, slide rails 24 and a sliding platform 32 of an acceleration chute 33.

Figure 2:
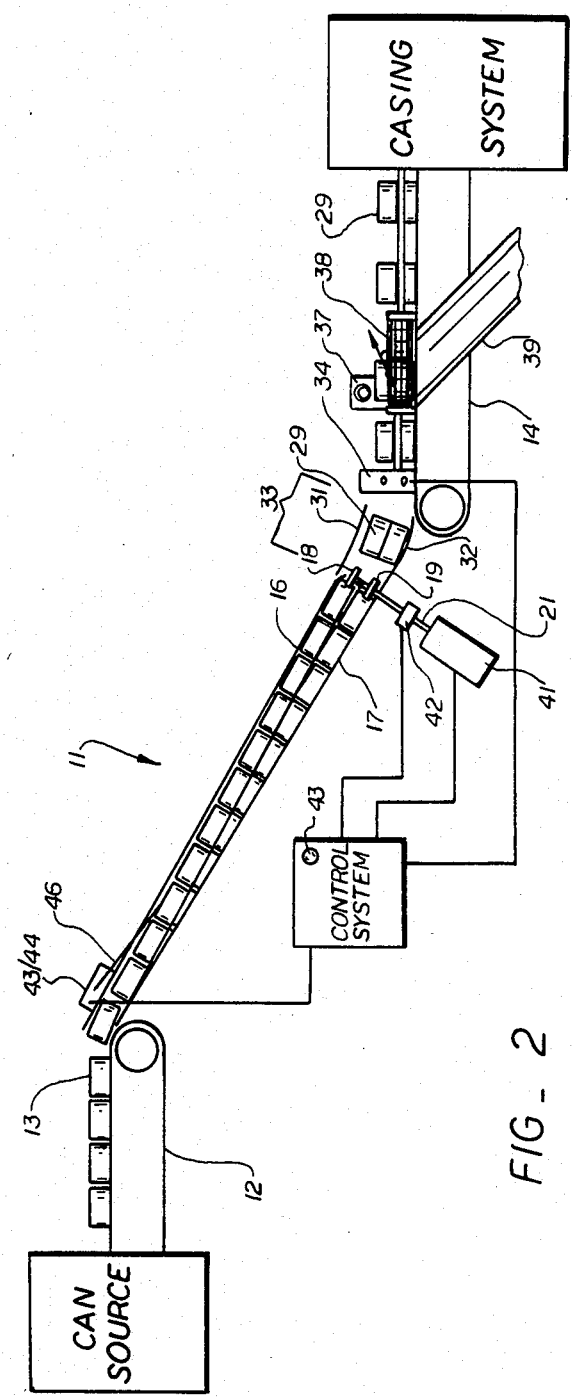
FIG. 2 is a flow diagram illustrating the flow of cans through the invented machine.

Referring to FIG. 2, the acceleration chute 33 is designed to provide additional speed to each stacked pair of cans 29 after it is released so that there will be a space between the successively discharged stacked can pairs 29 as they are received on the lower conveyer 14. In particular, the length and angle of the slide 32 is largely determined by the amount of spacing desired between the stacked can pairs 29 of the lower conveyer 14. The speed of the lower conveyer 14 should be sufficient to convey each stacked pair of cans 29 away from the bottom end of the acceleration chute 33 before the next pair of stacked cans arrive. Finally, the slide 32 of the acceleration chute 33 should curve from the inclined plane of the gravity chutes to the horizontal plane of the lower conveyer 14 at output so that the stacked cans sliding from the machine do not tumble as they slide onto the lower conveyer 14. The stacked pairs of cans 29 received on the lower conveyer 14, from the acceleration chute 33 are then carried single-file toward the point of casing, the can pairs 29 being spaced a discrete distance apart.

A dual beam photo-optic sensing system 34 is located downstream from the stacking machine 11 such that the upper can and lower can of a stacked pair 29 interrupt the two vertically spaced beams of light 36. In the event a single can is carried by the photo sensing point, only the lower light beam would be interrupted, a condition which activates a blower 37, which directs a stream of air transversely with respect to the direction of travel of the lower conveyer 14 blowing the single can to one side of the conveyer 14. Simultaneously, a swing gate 38 pivots outwardly to intercept the single can directing it to flow down a side chute 39. Downstream from the swing gate 38, the stacked pairs of cans are collected and cased.

Referring now to FIG. 4, an independent motor 41 rotates the shaft 21 carrying the upper and lower starwheels 18 and 19. When the machine is not operating, a normaly engaged brake 42 prevents or resists rotation of the shaft 21 due to the weight of the cans 13 in the chutes 16 and 17 resting against the arms 22 of the starwheels 18 and 19. In more detail, the brake 37 being "normally engaged" brakes unless energized by electrical power. Hence, when power to the brake is interrupted, it will close preventing discharge of any cans.

The rate of rotation of motor 41 rotating the shaft 21 carrying starwheels determine rate of discharge of stacked can pairs 29 from chutes 16 and 17 totally independent of both the flow rate of the single cans 13 on the elevated conveyer 12 and the flow rate of the stacked pairs of cans 29 on the lower conveyer 14.

Figure 5:
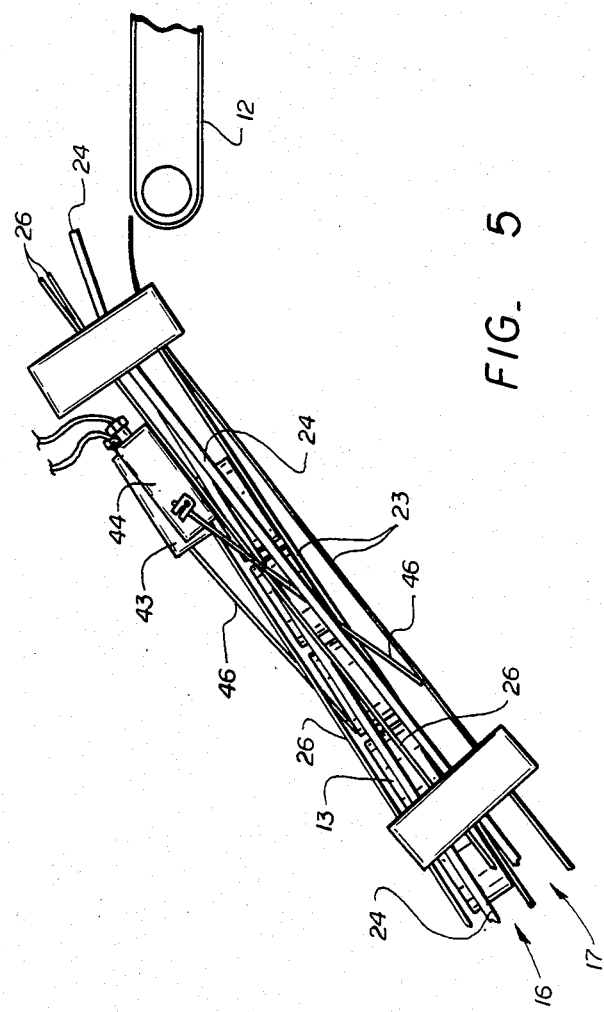
FIG. 5 is a side elevation view of the invented machine illustrating operation of the limit switches.

Referring to FIG. 5 limit switches 43 and 44 include sensing arms 46 located to determine the presence or absence of cans 13 sliding down the respecive upper and lower chutes 16 and 17. As illustrated in FIG. 5, the sensing arm 46 of each limit switches 43 and 44 rotates from a "closed" position where the end of the arms 41 rest on the top of a can when the chute is full, to an "open" position resting on the sliding platform 23 of the particular chute in the absence of a can. Accordingly, the limit switches 43 and 44 are "normally open" i.e., open when the sensing arm rests on the sliding platform of a particular chute and closed when the sensing arm is held up by a can sliding down a particular chute. Either limit switch 43 or 44 will interrupt power to the motor 41 and brake 42. A manual switch 43 is also provided for interrupting power to the motor 41 and brake 42 to allow an operator to stop operation of the stacker.

From the foregoing, it should be apparent that the rate at which the invented machine stacks cans determines the rate of operation of the entire casing system. Since the stacking rate is determined by the rotation rate of the motor rotating the starwheel, it is possible to control the entire casing system by regulating that motor. Accordingly, a conventional control system 45 for varying the rate of rotation (RPM) of the motor 41 should be included as a desired feature of the invented stacking machine to provide a single operator with the ability to vary the rate of casing of the entire can casing system.

In operation, the invented machine recieves a stream of cans from conventional conveyer at an elevated level, divides that stream into two can streams sliding single file down two gravity chutes. The cans sliding down the gravity chutes close the limit switches and electrical power is supplied to the brake and motor. The brake releases and the motor drives the shaft rotating the starwheels. The starwheels collocate and discharge the cans from the chutes in vertically registering pairs. The leaf spring terminating the top rail of the upper chute urges the vertically registering pair of cans together, the bottom of the top can nesting in the top of the bottom can. The stacked pairs of cans then slide out of the machine down the accelerating chute to provide spacing and are received on the lower level conveyer. The lower conveyer then carries the stacked pairs of cans in a row through the photo-optical sensing system which determines whether or not any of the can pairs have toppled. If one has, the blower is activated and the toppled pair of cans are blown to one side of the lower conveyer where they are captured by the pivoting swing gate and diverted to the side conveyer for recycling through the stacking machine. The stacked pairs of cans continue on the lower conveyer to a casing machine.

While the invented gravity feed can stacking machine has been described in context of a particular embodiment, variations and modifications of the machine may be made without departing from the scope of the invention as set forth in the following claims.

What is claimed is:

1. A machine for stacking nestable containers comprising in combination,
    a pair of inclined chutes each having a sliding platform, two side rails, and a top rail which, in combination, define two horizontally parallel channels at an elevated level each shaped to receive one container at a time, the channels becoming vertically parallel, upper and lower chutes at a lower elevation, the chutes bridging from the elevated level at their upper ends to a lower level at their lower ends, whereby a stream of the containers at the elevated level is received and divided into two single file container streams which are positioned vertically parallel one above the other at a lower elevation as the containers slide down the chutes from the elevated level toward the lower level;
    collocating means located proximate the lower ends of the chutes for positioning the containers sliding down the chutes in vertically registering pairs, and discharging each vertically registering pair of containers from the chutes to the lower level, the sliding platform of the upper chute having a lower end with a concave scalloped configuration at a point less than one container diameter upstream from the collocating means;
    resilient means for urging each vertically registering pair of containers into nested engagement as each container sliding down the upper chute slides off the concave scalloped lower end of the sliding platform of the upper chute;
    accelerating means receiving each pair of vertically nested containers as the containers are discharged from the chutes accelerating and conveying each pair of nested containers onto the lower level for establishing spacing between the vertically nested containers on the lower level, whereby, a stream of single containers received at the elevated level are stacked and spaced apart in nested pairs at the lower level.

2. The machine of claim 1 wherein the collocating means includes:
    a shaft journaled for rotation about an axis perpendicularly oriented with respect to the two vertically related single file container streams sliding down the pair of chutes;
    a starwheel journaled to the shaft having a plurality of arms symmetrically extending from its hub for simultaneously intercepting a container in each chute as the containers slide single file down the chutes, each extending arm of the starwheel revolving into the respective single file container streams as the shaft rotates establishing vertical registry of the respective cans in the respective container streams intercepted;
    normally engaged brake means for braking rotation of the shaft;
    motor means for rotating the shaft; and
    a control means switchable between an on condition an an off condition for simultaneously releasing the normally engaged brake means and energizing the motor means for rotating the shaft upon being switched to the on condition and for simultaneously de-energizing the motor means and allowing the normally engaged brake means to engage braking rotation of the shaft upon being switched to the off condition.

3. The machine of claim 2 further including normally open sensing means, sensing presence and absence of containers sliding down each chute coupled to the control means for switching it to an off condition interrupting discharge of containers from both chutes responsive to an absence of cans sliding down one of the chutes and switching it to an on condition responsive to container sliding down both chutes.

4. The machine of claim 3 wherein the normally open sensing means is located upstream from the starwheel.

5. The machine of claim 4 wherein the normally open sensing means comprises a limit switch mounted on the top rail of each chute, each limit switch having an arm pivotable between a closed position resting on a top of a container sliding down the particular chute and an open position resting on the sliding platform of the particular chute for switching the control means to the on and off conditions respectively, the arm extending downward into and in the direction of the particular single file stream of containers sliding down the particular chute, whereby a container must be present in both the chutes supporting the respective pivoting arms of the limit switches for discharge of vertically registering containers from the chutes by the starwheel.

6. The machine of claim 1 wherein the upper chute top rail has a lower end located less than one container diameter beyond the lower end of the upper chute sliding platform; and
    wherein the resilient means is mounted on the lower end of the upper chute top rail and is positioned for tipping the container sliding off the lower scalloped end of the upper chute sliding platform into nested engagement with the vertically registering container sliding below it in the lower chute.

7. The machine of claim 6 wherein the resilient means comprises a leaf spring element having one end secured to the lower end of the upper chute top rail extending at an angle downwardly approximately one container diameter toward the lower level, its distal end being spaced less than two container heights from the lower chute sliding platform.

8. The machine of claim 2 or 7 wherein the accelerating means comprises an inclined accelerating chute located for receiving each pair of the nested containers as they are released by the extending arm of the starwheel.

9. The machine of claim 8 wherein the accelerating chute has a sliding platform coextensive with the lower chute sliding platform, side rails coextensive with the side rails of both the upper and lower chutes and a top rail which, in combination, define a channel dimensioned for receiving a pair of vertically stacked containers, the accelerating chute curving the stream of vertically stacked containers from a direction inclined downwardly to a horizontal direction, the vertically stacked containers being received by a lower level conveyer.

* * * * *